United States Patent
Shirai

(10) Patent No.: US 8,951,131 B2
(45) Date of Patent: Feb. 10, 2015

(54) ROTATION TRANSMITTING DEVICE AND MOTOR

(75) Inventor: Nakatsune Shirai, Kosai (JP)

(73) Assignee: Asmo Co., Ltd., Shizouka-Ken (JP)

( * ) Notice: Subject to any disclaimer, the term of this patent is extended or adjusted under 35 U.S.C. 154(b) by 0 days.

(21) Appl. No.: 13/991,395

(22) PCT Filed: Dec. 8, 2011

(86) PCT No.: PCT/JP2011/078428
§ 371 (c)(1),
(2), (4) Date: Jun. 3, 2013

(87) PCT Pub. No.: WO2012/081494
PCT Pub. Date: Jun. 21, 2012

(65) Prior Publication Data
US 2013/0252745 A1 Sep. 26, 2013

(30) Foreign Application Priority Data
Dec. 17, 2010 (JP) .................................. 2010-281765

(51) Int. Cl.
*F16D 3/78* (2006.01)
*F16F 15/124* (2006.01)

(52) U.S. Cl.
CPC .............. *F61D 3/68* (2013.01); *F16F 15/1245* (2013.01)
USPC ........................................................ 464/73

(58) Field of Classification Search
USPC ........................ 464/73, 75, 76, 85; 123/192.1
See application file for complete search history.

(56) References Cited

U.S. PATENT DOCUMENTS

| 5,564,981 A | * | 10/1996 | Iwabuchi et al. | ............... 464/73 |
| 2002/0047376 A1 | | 4/2002 | Torii et al. | |

FOREIGN PATENT DOCUMENTS

| GB | 827272 | * | 2/1960 | .................. 464/85 |
| JP | 62-151465 | | 9/1987 | |
| JP | 2001343052 A | | 12/2001 | |

OTHER PUBLICATIONS

International Preliminary Report on Patentability (Form PCT/IB/373) pertaining to PCT/JP2011/078428, Feb. 17, 2012.

* cited by examiner

*Primary Examiner* — Gregory Binda
(74) *Attorney, Agent, or Firm* — Marsh Fischmann & Breyfogle LLP

(57) ABSTRACT

A rotation transmission device transmits the rotation force to an output shaft. The rotation transmission device includes a rotation body and a buffer mechanism. The rotation body includes a plurality of engagement portions. The buffer mechanism includes an elastic member and a transmission plate. The elastic member includes multiple pairs of damper portions. Each pair of damper portions is arranged to contact two side surfaces of one of the engagement portions. The transmission plate includes an output connection portion, a planar portion, and a plurality of engagement pieces. The output connection portion is connected to the output shaft. The engagement pieces are bent from the planar portion to project in an axial direction. Each of the engagement pieces cooperate with one of the engagement portions to sandwich each of the damper portions in the circumferential direction.

8 Claims, 3 Drawing Sheets

ROTATION TRANSMITTING DEVICE AND MOTOR

TECHNICAL FIELD

The present invention relates to a rotation transmission device that transmits rotation force through a buffer mechanism and further relates to a motor.

BACKGROUND ART

A conventional motor for a power window device or the like includes a motor body, which rotates and drives a rotation shaft, and a reduction drive, which serves as a rotation transmission device including a worm gear that reduces the rotation speed of the rotation shaft. Such a reduction drive may include a worm wheel coupled to an output shaft by a buffer mechanism. Patent document 1 discloses an example of a buffer mechanism including an elastic member and a transmission plate. In patent document 1, a worm wheel includes a plurality of engagement portions arranged at equal angular intervals in the circumferential direction. The elastic member includes two dampers arranged to contact the two circumferential ends of each engagement portion. The transmission plate includes an engagement bulging portion that is bulged to cooperate with the engagement portions to sandwich each damper in the circumferential direction. Further, patent document 1 describes a further transmission plate including an engagement piece bent from a metal plate in lieu of the engagement bulging portion. A single engagement bulging portion or a single engagement piece is arranged between the dampers that are adjacent in the circumferential direction and shared by the dampers.

In such a motor, the rotation force of the worm wheel (engagement portions) is transmitted to the transmission plate (engagement bulging portion or engagement piece) by the dampers. This rotates the output shaft coupled to the transmission plate. In such a motor (rotation transmission device), the dampers are elastically deformed to dampen the impact produced when a sudden load is applied to the output shaft (transmission plate) during, for example, rotation of the worm wheel.

PRIOR ART DOCUMENT

Patent Document

Patent Document 1: Japanese Laid-Open Patent Publication No. 2001-343052 (refer to FIGS. 1 and 6)

SUMMARY OF THE INVENTION

However, to form the engagement bulging portion on the transmission plate, a drawing process is required to be performed on a metal plate in multiple stages. This increases, for example, the manufacturing cost of the transmission plate. Further, when using the transmission plate that includes the bent engagement piece, one of the dampers adjacent in the circumferential direction has one open axial end surface. This may bend one of the dampers in the axial direction, that is, deform and project the damper out of the transmission plate. Bending of the damper in such a manner may produce cracks or the like and damage the damper.

It is an object of the present invention to provide a rotation transmission device and a motor that obviate damage to the damper and facilitate manufacturing.

To achieve the above object, one aspect of the present invention is a rotation transmission device that transmits the rotation force of a drive source to an output shaft. The rotation transmission device includes a rotation body that receives the rotation force of the drive source. The rotation body includes a plurality of engagement portions arranged at equal angular intervals along a circumferential direction. Each of the engagement portions includes two side surfaces located at opposite sides in the circumferential direction. A buffer mechanism includes an elastic member and a transmission plate. The elastic member includes multiple pairs of damper portions. Each pair of damper portions is arranged to contact the two side surfaces of one of the engagement portions. The transmission plate is formed from a metal plate and includes an output connection portion connected to the output shaft, a planar portion that covers one axial end surface of each of the damper portions (multiple), and a plurality of engagement pieces that are bent independently from the planar portion to project from the planar portion in an axial direction. Each of the engagement pieces cooperate with one of the engagement portions to sandwich each of the damper portions in the circumferential direction.

DETAILED DESCRIPTION OF THE PREFERRED EMBODIMENTS

A motor for a power window device according to one embodiment of the present invention will now be described with reference to FIGS. 1 and 2.

Figure 1:
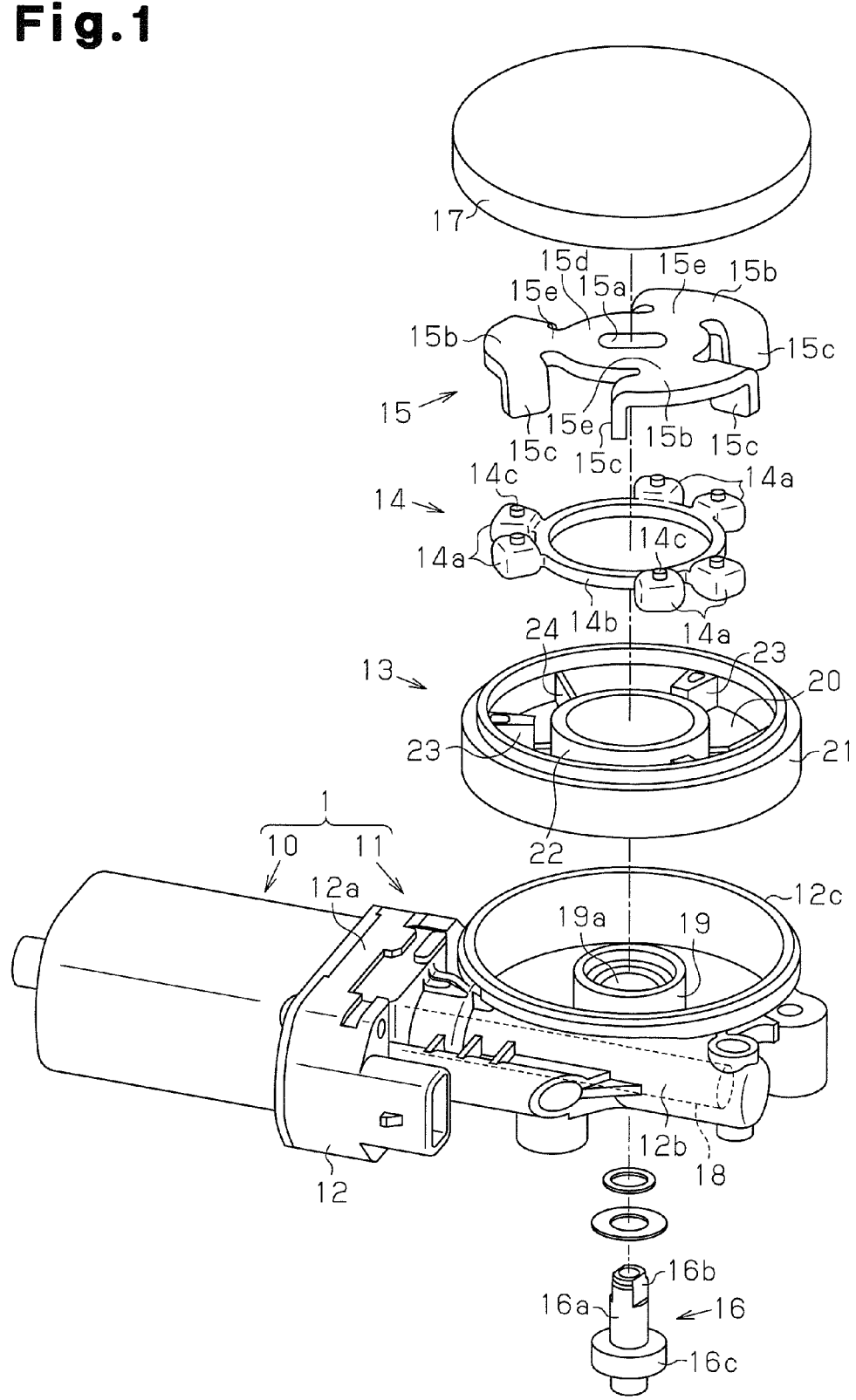
FIG. 1 is an exploded perspective view of a main portion of a motor according to one embodiment of the present invention.

As shown in FIG. 1, a motor 1 includes a motor body 10, which serves as a drive source, and a reduction drive 11. The motor body 10, which includes a rotation shaft (not shown), rotates and drives the rotation shaft. The reduction drive 11 includes a housing 12, a worm wheel 13 serving as a rotation body, a rubber damper 14 serving as an elastic member, a transmission plate 15, an output shaft 16, and a lid 17. In the present embodiment, the rubber damper 14 and the transmission plate 15 form a buffer mechanism.

The housing 12, which is made of a synthetic resin, includes a motor fastening portion 12a, a worm accommodation portion 12b, and a wheel accommodation portion 12c. The motor fastening portion 12a is fixed to the motor body 10 (yoke). The worm accommodation portion 12b formed along the axis of the motor body 10 accommodates and rotatably supports a worm 18 that rotates integrally with the rotation shaft of the motor body 10. The worm 18 is partially exposed in the wheel accommodation portion 12c.

The wheel accommodation portion 12c is generally cylindrical and includes a closed end. A cylindrical shaft support 19 is arranged on the central section of the closed end. The shaft support 19 includes a shaft hole 19a extending in the axial direction of the shaft support 19. The worm wheel 13 is rotatably supported and accommodated in the wheel accommodation portion 12c.

Figure 2A:
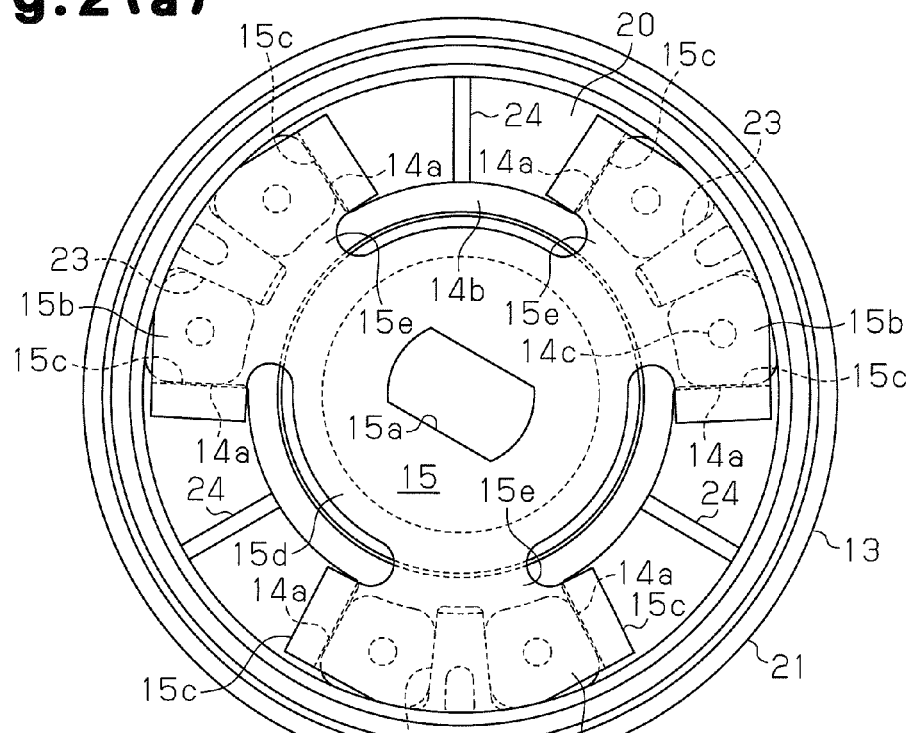
FIG. 2(a) is a plan view of a worm wheel, a rubber damper, and a transmission plate of FIG. 1 coupled to one another.
Figure 2B:
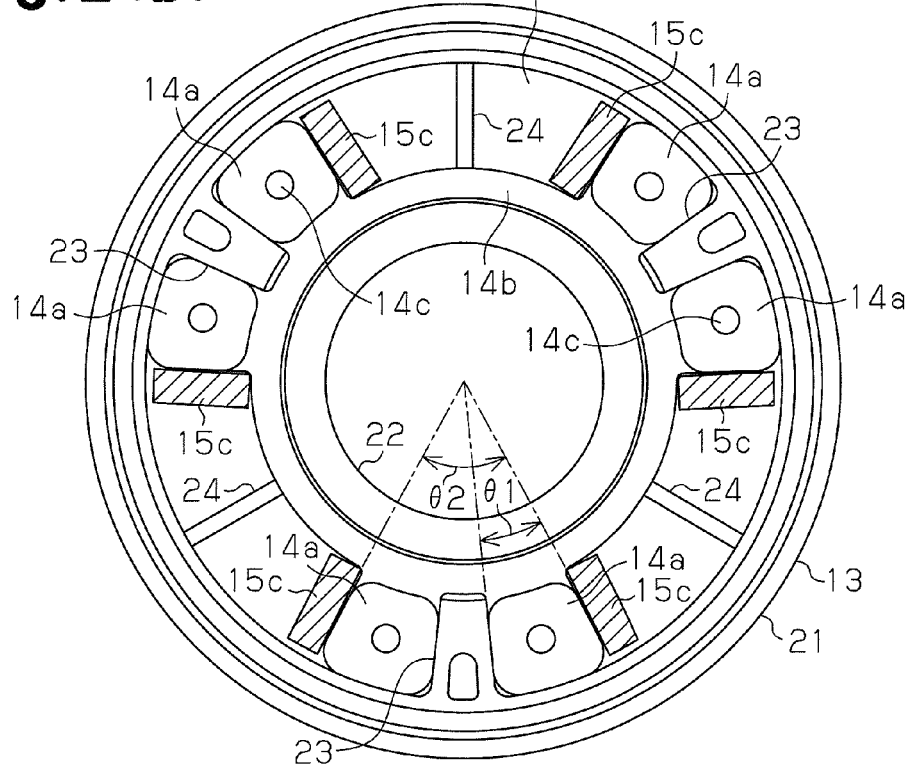
FIG. 2(b) is a plan view, partially shown in cross-section, of the worm wheel, the rubber damper, and the transmission plate of FIG. 1 coupled to one another.

The worm wheel 13, which is made of a synthetic resin, is generally cylindrical and includes a closed end. In detail, the worm wheel 13 includes a disk 20, which forms a bottom surface, and an outer circumferential wall 21, which extends from the outer circumference of the disk 20. The outer surface of the outer circumferential wall 21 includes teeth (not shown in FIG. 1) that are mated with the worm 18. A cylindrical inner circumferential wall 22 is arranged on the central section of the disk 20 extending in the same direction as the outer circumferential wall 21. Further, engagement portions 23 are arranged between the outer circumferential wall 21 and the inner circumferential wall 22 extending toward the outer circumferential wall 21. As shown in FIGS. 2(a) and 2(b), the present embodiment includes three engagement portions 23 arranged at equal angular intervals (120°). Further, the engagement portions 23 of the present embodiment are formed continuously with the outer circumferential wall 21 so that there is no gap from the outer circumferential wall. Gaps are formed between the engagement portions 23 and the inner circumferential wall 22. Reinforcement ribs 24 are arranged on the disk 20 between the engagement portions 23 that are adjacent in the circumferential direction. The reinforcement ribs 24 extend in the same direction as the engagement portions 23. The shaft support 19 (refer to FIG. 1) is fitted into the inner circumferential wall 22 of the worm wheel 13. The worm wheel 13 is rotatably supported in the shaft support 19 and accommodated in the wheel accommodation portion 12c. Here, the teeth of the worm wheel 13 are mated with the worm 18 exposed in the wheel accommodation portion 12c.

As shown in FIGS. 1 and 2, the rubber damper 14 includes three pairs of damper portions 14a and a connection portion 14b connecting the damper portions 14a. Each pair of damper portions 14a may be arranged to contact the two side surfaces of one of the engagement portions 23. Referring to FIG. 2(b), each damper portion 14a is sector-shaped as viewed in the axial direction. A small projection 14c is formed on an axial end surface of each damper portion 14a to decrease slide resistance against another member. Further, the connection portion 14b of the present embodiment connects the radially inner ends of each damper portion 14a so that the connected damper portions 14a are in an annular arrangement. In the present embodiment, each damper portion 14a has an angular width θ1 in the circumferential direction that is set to 22°. Each pair of the damper portions 14a has an angular width θ2 between the two circumferential ends that is set to 56°.

As shown in FIG. 2(b), the rubber damper 14 is arranged in the worm wheel 13 so that two damper portions 14a are in contact with the two circumferential sides of each engagement portion 23. The connection portion 14b of the rubber damper 14 is arranged in the gaps between the engagement portions 23 and the inner circumferential wall 22.

The transmission plate 15, which is formed from a metal plate, includes an output connection hole 15a (output connection portion) connected to the output shaft 16, planar portions 15b covering one axial end surface of each damper portion 14a, and engagement pieces 15c (six in the present embodiment) that project from the planar portions 15b and are bent independently to sandwich the damper portions 14a in the circumferential direction in cooperation with the engagement portions 23.

More specifically, the transmission plate 15 includes a generally circular central disk 15d. The output connection hole 15a extends through the center of the central disk 15d in the axial direction of the disk 15d. The output connection hole 15a includes two parallel sides. Outer extensions 15e are arranged at equal angular intervals (120°) on the peripheral portion of the central disk 15d. The outer extensions 15e outwardly extend in the radial direction. The planar portions 15b are defined by the distal ends of the outer extensions 15e. The planar portions 15b generally extend in the circumferential direction and cover one axial end surface of each damper portion 14a. Engagement pieces 15c that are bent to project in the axial direction are formed on the two circumferential ends of the planar portion 15b. The engagement pieces 15c cooperate with the engagement portions 23 to sandwich the dampers 14a in the circumferential direction. The engagement pieces 15c are bent generally along the radial direction by a pressing machine. The engagement pieces 15c may be formed from a simple planar metal plate so that the engagement pieces 15c do not contact one another before being bent.

The transmission plate 15 is accommodated in the worm wheel 13 and coupled to the worm wheel 13 so that the engagement pieces 15c cooperate with the engagement portions 23 to sandwich the damper portions 14a in the circumferential direction, that is, so that the two engagement pieces 15c at the two circumferential ends of the planar portions 15b sandwich the two circumferential end surfaces of each pair of the damper portions 14a. As shown in FIG. 2(a), the planar portions 15b generally and entirely cover one axial end surface (surface at upper side of the plane of FIG. 2) of each damper portion 14a.

As shown in FIG. 1, the output shaft 16 includes a shaft portion 16a. The shaft portion 16a includes one end defining a fitting portion 16b that may be fitted to the output connection portion 15a. The shaft portion 16a includes another end defining a gear 16c (teeth not shown in FIG. 1). The output shaft 16 is fitted into the shaft hole 19a from the fitting portion 16b, and the fitting portion 16b is fixed to the output connection portion 15a. As a result, the shaft support 19 (shaft hole 19a) rotatably supports the shaft portion 16a. The gear 16c, which projects out of the housing 12, is mated with a gear of a regulator (not shown). As a result, the regulator connects the output shaft 16 to a vehicle window (side glass).

The lid 17 is fixed to the housing 12 to close the opening of the wheel accommodation portion 12c.

The operation of the motor 1 (power window device) will now be described.

When a power window switch arranged on a vehicle (not shown) is operated and the motor 1 is supplied with power, the worm 18 is rotated and driven together with the rotation shaft of the motor body 10. The rotation of the worm 18 rotates the worm wheel 13. The rotation force of the engagement portions 23 produced by the rotation of the worm wheel 13 is transmitted to the engagement pieces 15c by the damper portions 14a. This rotates the output shaft 16 together with the transmission plate 15. As a result, the vehicle window is lowered or raised by the regulator and the like.

For example, when the vehicle window is raised and comes into contact with the window frame of the vehicle window thereby restricting further movement, a sudden load applied to the output shaft 16 (transmission plate 15) by rotation of the worm wheel 13 produces an impact between, for example, the worm wheel 13 and the worm 18 (specifically, the mating portions of the worm wheel 13 and the worm 18). Elastic deformation of the damper portions 14a reduces the impact.

The advantages of the above embodiment will now be described.

(1) The transmission plate 15 includes the planar portions 15b that cover an axial end of all six of the damper portions 14a. This obviates axial bending of the damper portions 14a, that is, deformation of the damper portions 14a such that the damper portions 14a project out of the transmission plate 15, and thereby obviates damages such as cracking of the damper portions 14a. Further, the transmission plate 15 includes the engagement pieces 15c that project from the planar portions 15b in the axial direction and sandwich the damper portions 14a in cooperation with the engagement portions 23. The engagement pieces 15c are bent independently from one another and may thus be easily folded without undergoing, for example, a drawing process. In other words, in comparison with when an engagement bulging portion having the same function is formed from a metal plate through a drawing process having multiple stages, the engagement pieces 15c may be easily formed with a simple pressing machine.

(2) The rubber damper 14 includes the connection portion 14b that connects the damper portions 14a. In comparison with when the damper portions 14a are discrete bodies, the number of components may be reduced, and the management and coupling of components may be facilitated. Further, the connection portion 14b of the present embodiment connects all of the dampers so that the connected damper portions 14a are in an annular arrangement. Thus, the rubber damper 14 is integrated into a single unit. Accordingly, in comparison with when the dampers 14a are pairs (sets) of discrete bodies, or three members, the number of components may be reduced. This facilitates the management and coupling of components.

The above embodiment may be modified as described below.

In the above embodiment, three engagement portions 23 are formed at equal angular intervals (120°), and the rubber damper 14 includes three pairs of the dampers 14a. That is, in the above embodiment, the number of engagement portions 23 is the same as the number of pairs of the damper portions 14a. However, there is no limitation to such a structure, and the number of the engagement portions 23 and the number of pairs of the damper portions 14a may be increased, as shown in FIGS. 3(a) and 3(b).

Figure 3A:
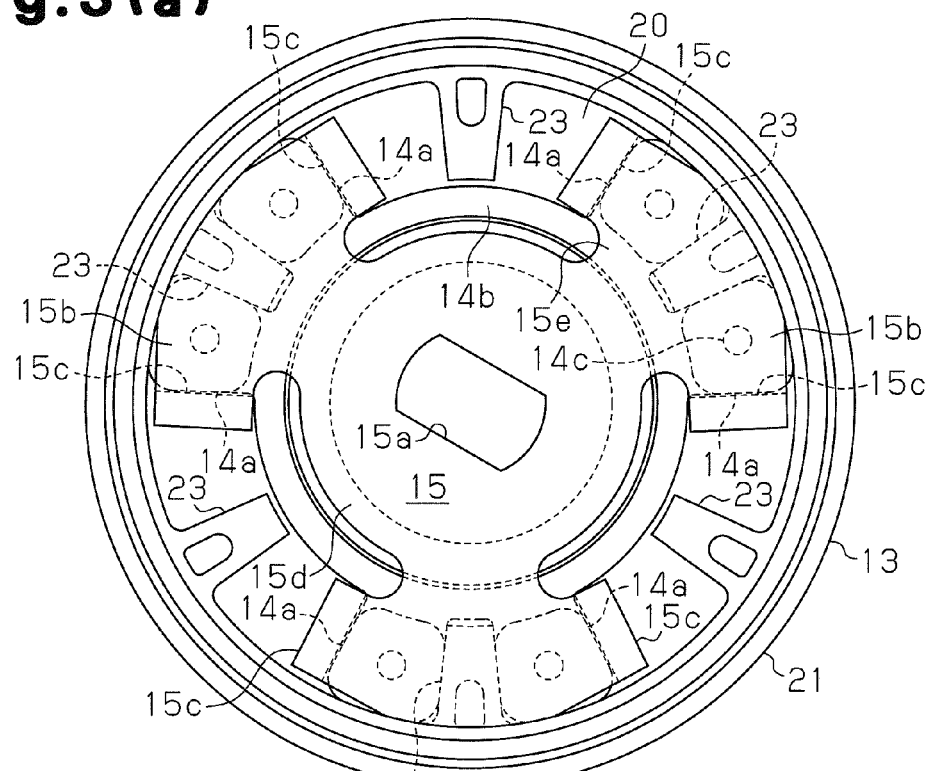
FIG. 3(a) is a plan view of a worm wheel, a rubber damper, and a transmission plate of a further example coupled to one another.
Figure 3B:
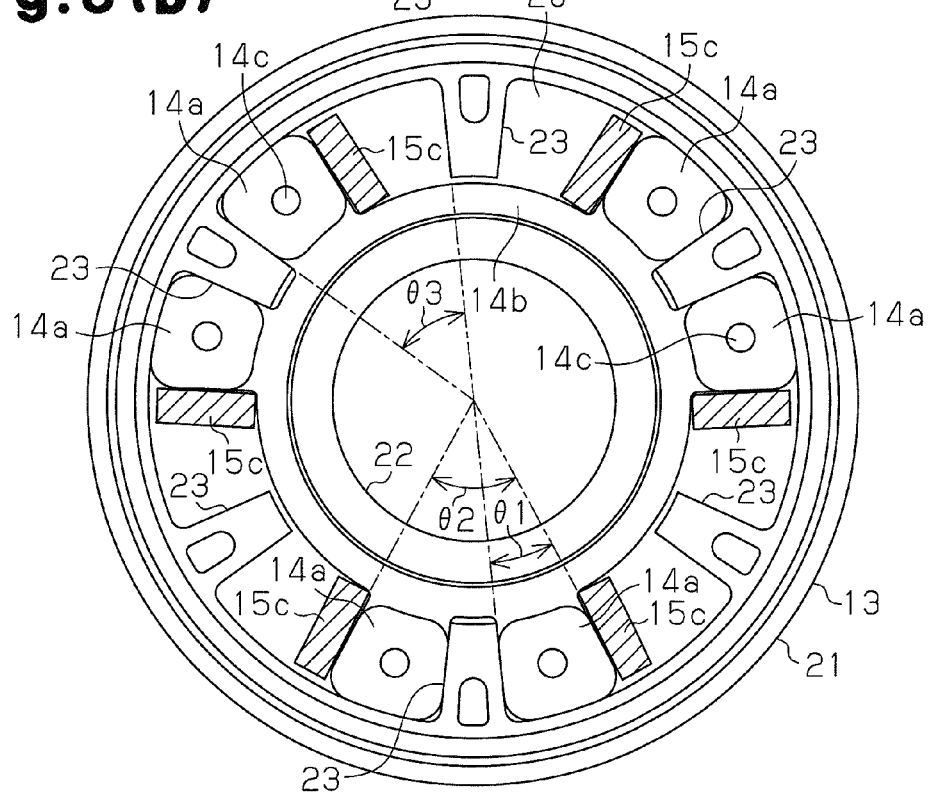
FIG. 3(b) is a plan view, partially shown in cross-section, of the worm wheel, the rubber damper, and the transmission plate of the further example coupled to one another.

In detail, in the example of FIGS. 3(a) and 3(b), there are more engagement portions 23 than the number of pairs of the damper portions 14a so that the angular width θ3 between opposing surfaces of the engagement portions 23, adjacent to each other in the circumferential direction, is smaller than the angular width θ2 between the two circumferential ends of each pair of the dampers 14 connected by the connection portion 14b. In this example, the angular width θ2 is 56°, and the angular width θ3 is 48°. Further, in this example, there are three pairs of the dampers 14a and six engagement portions 23. In other words, in this example, the reinforcement ribs 24 of the above embodiment 23 are changed to the engagement portions 23 so that the number of the engagement portions 23 is greater than the number of pairs of the damper portions 14a (three). Thus, the angular width θ3 is smaller than the angular width θ2. Needless to say, the angles θ1 to θ3 may be changed to other angles.

In this case, erroneous coupling of the rubber damper 14 to the worm wheel 13 may be obviated while decreasing the circumferential width of the damper portion 14a. That is, when the circumferential width of the damper portion 14a is set to be small and the angular width θ3 is greater than the angular width θ2, erroneous coupling such as the pairs of the dampers 14a being accommodated between the engagement portions 23 that are adjacent in the circumferential direction may be avoided. A decrease in the circumferential width of the damper portion 14a also contributes to reduction in material cost and weight. Further, when three pairs of the damper portions 14a are arranged at equal angular intervals in the circumferential direction, power is transmitted with good balance between the worm wheel 13 and the transmission plate 15. This absorbs impacts in a balanced manner.

In the above embodiment, although there are three pairs of the damper portions 14a, there is no such limitation, and there may be any number of pairs, such as two pairs or four pairs. In this case, the number of the engagement portions 23 and the engagement pieces 15c should be changed in accordance with the number of the pairs.

In the above embodiment, the rubber damper 14 includes the connection portion 14b that connects the damper portions 14a. However, there is no such limitation, and the dampers 14a may all be discrete bodies. Further, in the above embodiment, the connection portion 14b connects all of the damper portions 14a so that the connected dampers 14a are in an annular arrangement. However, not all of the damper portions 14a have to be connected. For example, each pair of the damper portions 14a may be a discrete body, and a rubber damper may be formed by three members.

In the above embodiment, the present invention is embodied in the power window device motor 1 and may be embodied in a motor for a different device. Further, the present invention may be embodied in any device including a rotation transmission device that transmits rotation force to an output shaft through a rotation body, a rubber damper, and a transmission shaft.

The invention claimed is:

1. A rotation transmission device that transmits rotation force of a drive source to an output shaft, the rotation transmission device comprising:
    a rotation body that receives the rotation force of the drive source, wherein the rotation body includes a plurality of engagement portions arranged at equal angular intervals along a circumferential direction, and each of the engagement portions includes two side surfaces located at opposite sides in the circumferential direction; and
    a buffer mechanism that includes an elastic member and a transmission plate, wherein
        the elastic member includes multiple pairs of damper portions, wherein each of the pair of damper portions is arranged to contact the two side surfaces of one of the engagement portions,
        the transmission plate is formed from a metal plate and includes an output connection portion connected to the output shaft, a planar portion that covers one axial end surface of each of the damper portions, and multiple pairs of engagement pieces that are bent independently from the planar portion to project from the planar portion in an axial direction, wherein each pair of the engagement pieces cooperates with one of the engagement portions to sandwich each pair of the damper portions in the circumferential direction, and
        the number of the damper portions is the same as the number of the engagement pieces.

2. The rotation transmission device according to claim 1, wherein the elastic member includes a connection portion that connects the damper portions.

3. The rotation transmission device according to claim 2, wherein the number of the engagement portions is the same as the number of the pairs of damper portions.

4. The rotation transmission device according to claim 3, wherein
    the number of the pairs of damper portions is three, and
    the engagement portions are three engagement portions arranged at equal angular intervals in the circumferential direction.

5. The rotation transmission device according to claim 2, wherein the number of the engagement portions is greater than the number of the pairs of damper portions so that an angular width between circumferentially opposing surfaces of the engagement portions that are adjacent to each other in the circumferential direction is smaller than an angular width between two circumferential ends of one of the pairs of damper portions connected by the connection portion.

6. The rotation transmission device according to claim 5, wherein
the number of the pairs of damper portions is three, and
the engagement portions are six engagement portions arranged at equal angular intervals in the circumferential direction.

7. The rotation transmission device according to claim 2, wherein the connection portion connects all of the damper portions in an annular arrangement.

8. A motor comprising:
a drive source; and
a rotation transmission device that transmits rotation force of the drive source to an output shaft, the rotation transmission device including:
  a rotation body that receives the rotation force of the drive source, wherein the rotation body includes a plurality of engagement portions arranged at equal angular intervals along a circumferential direction, and each of the engagement portions includes two side surfaces located at opposite sides in the circumferential direction; and
a buffer mechanism that includes an elastic member and a transmission plate, wherein
  the elastic member includes multiple pairs of damper portions, wherein each of the pair of damper portions is arranged to contact the two side surfaces of one of the engagement portions,
  the transmission plate is formed from a metal plate and includes an output connection portion connected to the output shaft, a planar portion that covers one axial end surface of each of the damper portions, and multiple pairs of engagement pieces that are bent independently from the planar portion to project from the planar portion in an axial direction, wherein each pair of the engagement pieces cooperates with one of the engagement portions to sandwich each pair of the damper portions in the circumferential direction, and
  the number of the damper portions is the same as the number of the engagement pieces.

* * * * *

UNITED STATES PATENT AND TRADEMARK OFFICE
CERTIFICATE OF CORRECTION

PATENT NO.         : 8,951,131 B2
APPLICATION NO.    : 13/991395
DATED              : February 10, 2015
INVENTOR(S)        : Natatsune Shirai It is certified that error appears in the above-identified patent and that said Letters Patent is hereby corrected as shown below:

On The Title Page, Item (73) Assignee: (City and State or Country), delete "Shizouka-Ken" and insert therefor --Shizuoka-ken--

Signed and Sealed this
Nineteenth Day of May, 2015

Michelle K. Lee
*Director of the United States Patent and Trademark Office*